(12) United States Patent
Kobayashi et al.

(10) Patent No.: US 7,101,080 B2
(45) Date of Patent: Sep. 5, 2006

(54) HYDROSTATIC PRESSURE LINEAR GUIDE DEVICE

(75) Inventors: Kazuo Kobayashi, Gunma (JP); Etsuo Fujita, Gunma (JP)

(73) Assignee: Okamoto Machine Tool Works Ltd., Annaka (JP)

( * ) Notice: Subject to any disclaimer, the term of this patent is extended or adjusted under 35 U.S.C. 154(b) by 154 days.

(21) Appl. No.: 10/868,807

(22) Filed: Jun. 17, 2004

(65) Prior Publication Data
US 2005/0147332 A1 Jul. 7, 2005

(30) Foreign Application Priority Data
Jan. 6, 2004 (JP) .............................. 2004-000845

(51) Int. Cl.
*F16C 32/06* (2006.01)
(52) U.S. Cl. ....................................................... 384/12
(58) Field of Classification Search .................... 384/12
See application file for complete search history.

(56) References Cited

U.S. PATENT DOCUMENTS

| | | | |
|---|---|---|---|
| 3,355,990 A * | 12/1967 | Thum | 384/12 |
| 3,754,799 A * | 8/1973 | Hedberg | 384/12 |
| 4,584,916 A * | 4/1986 | Inoue et al. | 384/12 |
| 4,653,408 A * | 3/1987 | Nagashima et al. | 384/12 |
| 4,744,675 A * | 5/1988 | Sakino et al. | 384/12 |
| 4,974,970 A | 12/1990 | Sugita et al. | 384/12 |
| 6,276,491 B1 | 8/2001 | Schonfeld | 184/7.3 |

FOREIGN PATENT DOCUMENTS

| | | |
|---|---|---|
| JP | 63-74536 | 4/1988 |
| JP | 6000735 | 1/1994 |
| JP | 7299684 | 11/1995 |
| JP | 2000-74065 | 3/2000 |

OTHER PUBLICATIONS

Hyprostatick Schonfeld GmbH "Hydrostatic Slide With Keepers," "Hydrostatic Guideways Without Keepers," "Advantage of PM-Flow Controller Over Capillary Tube," "Advantages of Hydrostatik Over Sliding Elements," "Hydrostatic V-flat Guideway," Hydrostatic Linear Motor Guide, no date.

* cited by examiner

*Primary Examiner*—Thomas R. Hannon
(74) *Attorney, Agent, or Firm*—Oblon, Spivak, McClelland, Maier & Neustadt, P.C.

(57) ABSTRACT

A non-contact type hydrostatic linear guide device includes a guide unit having a pair of rail parts on the top surface thereof, and a slide unit having oil pockets in a running surface thereof. A load of the slide unit concentrates on the frame of the guide unit. The slide unit has a stepped leg structure in which projections are disposed in the under surface of a table thereof in bilateral symmetry. The projections contact the top surface of inner projections disposed on the guide unit and the outer side surfaces thereof face the inner surfaces of the wear plates disposed on the guide unit, and wear plates are placed outward in the midway of the under surfaces of the projections as the side surfaces thereof face the both side surfaces of the first recessed part and the third recessed part of the guide unit.

2 Claims, 12 Drawing Sheets

HYDROSTATIC PRESSURE LINEAR GUIDE DEVICE

BACKGROUND OF THE INVENTION

1. Field of the Invention

This invention relates to an improvement of a hydrostatic pressure linear guide device which is adapted as a worktable or a tool-table of a grinding machine. More particularly, it relates to a hydrostatic pressure linear guide device which comprises a slide unit having a static pressure guide surface to which plural number of pressure pockets are formed which cooperates with a regulator controlling fluid flow from a pump to the hydrostatic pockets, and a guide unit having a pair of guide rails.

2. Description of the Prior Art

Hydrostatic pressure linear guide devices are used as a work-table or a tool-table of work-machining apparatus such as a cylindrical grinding machine, a cam grinding machine, a crank shaft grinding machine, a dicer, NC lathe, and so on.

The hydrostatic pressure linear guide device includes a guide unit (guideway) having a pair of right and left rails formed on an upper surface of a bed, and a slide unit (slideway) having plural oil static pressure pockets formed respectively on a lower surface and a side wall of the slide unit. The device also includes one or more controllers controlling oil flow from an oil pump to the oil pockets in which a static pressure between the rails and slide unit is maintained at a predetermined level. The slide unit is driven by a linear motor, a servo-motor with a ball-screw or hydraulic cylinder.

Conventional hydrostatic pressure linear guide devices have guiding faces provided with absolute flatness wherein the sliding table is floating on a static oil membrane to obtain an ultra precision straightness. The guiding faces of the slide unit are not in contact with the pair of right and left rails of the guide unit during sliding.

Hydrostatic pressure linear guide devices are known in the art as described in JP-A-63-74536, JP-A-6-735, JP-A-7-299684, and JP-A-2000-74065.

The JP-A-63-74536 reference shows a static pressure linear guide device including a guide unit 1 having a base 201 and a pair of rails 2 on the upper surfaces of a pair of wear plates 20a, 20b having slant faces 60 supported by the base 201. The device also includes a slide unit 3 having a slide base 3a and a pair of wear plates 3b, 3c whose upper surfaces are positioned facing the guide surfaces of the wear plates 20a, 20b. The device further includes a pressure feeding means which is provided for mutually independently regulating pressures respectively fed to upper, lower, left, and right pockets arranged to the slide unit 3 to form static pressure bearing. A return flow of the pressure oil fed to a static pressure generating unit is controlled by a static pressure squeezing land section A2 and the static pressure is generated in the static pressure generating band width L, and this static pressure is applied to the guiding face 21 of the rails 2 and the guided face 31 of the moving slide unit 3 to keep them at a fixed distance. A land section B1 holds a fixed small gap E so as not to bring the guided face 31 and the guiding face 21 into contact by the action of the static pressure.

Accordingly, when the slide unit 3 is moved in a straight line direction against the rails 2, a fluid between many recesses 6 having slant faces 60 and opposing faces to them is compressed, and the dynamic pressure is generated.

The JP-A-7-299684 reference shows a static pressure linear guide device composed of a guide unit 1 having a pair of right and left guide parts 3, 4 and a slide unit 2, where the slide unit 2 has a pair of right and left slide recess parts 5, 6 provided with both sides of the slide unit brought into contact with the upper face parts 3a, 4a of the right and left guide parts 3, 4, oil pockets 7, 8 in the upper face 5a, 6a of the slide recess parts 5, 6 oil pockets 7, 8 in the under face 5c, 6c of the slide recess parts 5, 6. The slide unit 2 has oil pockets 9, 10 at the end face 5b, 6b of the slide recess parts 5, 6 and has the first and the second shut-off valves 25, 26 closed to stop the supply of pressure oil into oil pockets 7, 8, 11, 12 for lowering the slide 2, and the upper face parts 5a, 6a of right and left slide recess part 5, 6 are thereby brought into contact with the upper face parts 3a, 4a of right and left guide parts 3, 4 ,the third shut-off valve 27 closed to stop the supply of pressure oil into an oil pocket 9 for moving a slide 2 to the left, and the fourth shut-off valve 28 closed to stop the supply of the pressure oil into an oil pocket 10.

The JP-A-2000-74065 reference shows a static pressure linear guide device including a guide unit 10 having a pair of right and left guide parts 11, 12 formed on an upper surface of a bed 10 and a slide unit 20 sliding along to the pair rails. The rails 11, 12 are furnished with rectangular cross-sections and formed so as to be overhung from the upper surface and a side surface of the bed 10 along the both side surfaces of the bed 10. Step parts 17, 18 are formed on the both side surfaces of the bed 10 so as to face to lower surfaces of the rails 11, 12. Wear plate parts 23, 24 are installed on lower end surfaces of leg parts 25, 26 of the table 20 and are guided by the lower surfaces of the rails 11, 12 on their upper surfaces and by upper surfaces of the step parts 17, 18 on their lower surfaces respectively. Static pressure pockets 31–38 are respectively formed on a lower surface of the table 20, the upper surfaces of the wear plates 23, 24, the lower surfaces of wear plates 23, 24 and side walls of the groove parts 21, 22 in which the rails 11, 12 are stored.

A load of the slide unit during sliding concentrates on the joint bolts of the guiding surfaces of the wear plates of the guide unit in those hydrostatic pressure linear guide devices, so that the wear plates are bending when massive work or tool is loaded on the sliding table. Consequently, the straightness of the obtained machining-work is about 1.0–2.0 μm per 1000 mm.

The flow rate Q is proportional to the third power of the gap height or the height h of the pocket gap through which the fluid flows. The result in the case of laminar flow is the condition $Q \sim p/h^3/\eta$, where η denotes the dynamic viscosity of the fluid and p is a pressure. The smaller the gap and the higher the hydrostatic fluid pressure is, the greater the stiffness of the hydrostatic pressure guide device is, but the consumer demand of fluid for raising the hydrostatic fluid pressure is increasing.

A floating distance (gap) between the table and a grinding head of the conventional hydrostatic pressure linear guide device depends on the feeding speed of the slide unit. In the conventional hydrostatic pressure linear guide device, it is variable in a range of 0.01–0.50 μm when the feeding speed is 1–25 m/minute and the shock of the reverse of tool-table is diminished in about 2.4–2.8 seconds.

The JP-A-6-735 reference shows a static pressure linear guide device including a guide unit 1 having upper, lower, left, and right guide surfaces 2a–2d, and a slide unit 3 having slide surfaces 4a–4d positioned facing the guide surfaces 2a–2d that are guided and supported to upper, lower, left, and right guide surfaces 2a–2d. A micro uneven surfaces 10 is formed in either the guide surfaces 2a–2d of the guide unit 1 or the slide surfaces 4a–4d of the slide unit 3, and a pressure feeding means 9 which is provided for mutually independently regulating pressures respectively fed to upper, lower, left, and right pockets 5a–5d arranged to the slide unit 3 to form a static pressure bearing.

In the hydrostatic pressure linear guide device, load of the slide unit concentrates on a frame of the guide unit during sliding, so that the stiffness of the hydrostatic pressure linear guide device is greater than those of the hydrostatic pressure linear guide devices described in above-mentioned three patents, but it is necessary to use greater power moving the slide unit.

The stiffness of the hydrostatic pressure linear guide device, the motor power moving the slide unit and utility of fluid depend on cross-sectional shapes of the slide unit and the guide unit and the position of the hydrostatic pressure pockets on the slide surface. The hydrostatic pressure linear guide devices described in the aforesaid patents may not fit for a large slide table having a length of more than 3000 millimeter or to be loaded with a massive tool.

When the dimensions of work-pieces to be machined become greater, the land length and width of a slide unit also become greater to increase the weight of the slide unit. Furthermore, tools also grow in size to increase the weight of the tools on the slide unit as well. In comparison with oil static pressure linear guide devices described in JP-A-63-74536 and JP-A-7-299684, an oil static pressure linear guide device described in JP-A-2000-74065 includes a slide unit having more sliding surfaces and higher stiffness in the vertical direction in machining. Therefore, it is suitable as a hydrostatic pressure linear guide device for machining large-sized work-pieces which requires higher accuracy.

The stiffness and the fluid-utility also depend on the numbers of regulators and shut-off valves provided with fluid-supply pipes in the body of the slide unit. Small numbers of these valves and pipes in the body is better to increase stiffness.

U.S. Pat. No. 6,276,491 and U.S. Pat. No. 6,220,281 show a regulator for controlling oil flow fed from oil supply to the plural number of hydrostatic pockets of the slide unit. A gap between the static pressure guide surface and the slide unit surface to be supported of the hydrostatic bearing is maintained always constant in accordance with the control of the operation oil temperature and the operation oil pressure.

The regulator has a controller housing with a mating surface and has pressure chambers which are separated by a control element, movable against the force of a spring element, and of which a first pressure chamber, subjected to a first pressure level, is directly connected to the medium supply. A second pressure chamber, subjected to a lower, second pressure, is connected to the medium supply via a first flow resistance, and a third pressure chamber, which is subjected to a third pressure level which corresponds to that in the hydrostatic pocket, is connected to the hydrostatic pocket. The control element forming a variable second flow resistance which is arranged between the second and third pressure chambers and influences the medium flow fed to the pocket. The magnitude of the variable second flow resistance being raised by the action of the force of the first pressure chamber but is lowered by the action of the spring force and by the actions of the forces of the second and third pressure chambers. The mating surface is assigned to the slide unit, and the controller housing has a bearing surface, including a passage orifice for the medium flow, with the aid of which in the mounted state the controller housing bears against the mating surface assigned to the slide unit, thus creating a direct medium connection between the controller and pocket and, if appropriate, between the controller and the oil supply.

The regulator is available from Schonfeld GmbH in Germany as a "PM-Flow Controller" (trade name). The regulator can change a quantity of fluid flow variably by valves to control a hydrostatic pressure flexibly and keep a change of the fluid membrane-thickness against the change of the load on the slide unit to a minimum, so that the gaps of the guiding surfaces throughout the machining plane are kept constant. It reduces a fluid demand and increases a stiffness of the hydrostatic pressure linear guide device.

SUMMARY OF THE INVENTION

An object of the present invention is to provide a hydrostatic pressure linear guide device having wear plates formed into a closed structure. The wear plates are to be leg parts of a slide unit for sliding inside a pair of recessed rails of a guide unit, thereby providing a structure that dust and dirt are hard to enter sliding surfaces in sliding, and improved stiffness in the vertical direction and stiffness in the transverse direction in machining.

According to a first aspect of the present invention, there is provided a hydrostatic linear guide device 50 comprising a guide unit 1 having a pair of rail parts 13a, 13c on the top surface thereof, and a slide unit 2 having oil pockets in a running surface thereof. The guide unit 1 has four projections 12a, 12b, 12c, 12d disposed on the top surface of a bed 11 in bilateral symmetry to arrange three recessed parts 13a, 13b, 13c, having wear plates 14a, 14b disposed outward in the midway of the top surfaces of the inner projections 12b, 12c so as to partially block the upper parts of the first recessed part 13a and the third recessed part 13c, and thus forming a first recessed rail 13a and a second recessed rail 13c. The slide unit 2 has a stepped leg structure in which projections 22a, 22b are placed in the under surface of a table 21 thereof in bilateral symmetry. The projections contact the top surfaces of the outer projections 12a, 12d disposed on the guide unit 1 and face the outer surfaces of the wear plates 14a, 14a disposed on the guide unit 1. Wear plates 23a, 23b are further placed inward in the midway of the under surfaces of the projections 22a, 22b as the side surfaces thereof face the both side surfaces of the first recessed part 13a and the third recessed part 13c of the guide unit 1. First sliding surfaces 31, 31 are disposed in the surface where the top surfaces of the first projection 12a and the fourth projection 12d of the guide unit 1 contact the under surfaces of the projections 22a, 22b of the slide unit 2. Second sliding surfaces 32, 32 are disposed in the surface where the under surfaces of the wear plates 14a, 14b of the guide unit 1 contact the top surfaces of the wear plates 23a, 23b of the slide unit 2. Third sliding surfaces 33, 33 are disposed in the surface where the side surfaces of the wear plates 14a, 14b of the guide unit 1 face the side surfaces of the projections 22a, 22b of the slide unit 2. A fourth sliding surface 34a is disposed in the surface where the inner surface of the first projection 12a forming the first recessed part 13a of the guide unit 1 faces the right-side surface of the wear plate 23a of the slide unit 2, and a fourth sliding surface 34b is disposed in the surface where the inner surface of the fourth projection 12d forming the third recessed part 13c of the guide unit 1 faces the left-side surface of the wear plate 23b of the slide unit 2. A fifth sliding surface 35a is disposed in the surface where the side surface of the second projection 12b forming the first recessed part 13a of the guide unit 1 faces the left-side surface of the wear plate 23a of the slide unit 2, and a fifth sliding surface 35b is disposed in the surface where the side surface of the third projection 12c forming the third recessed part 13c of the guide unit 1 faces the right-side surface of the wear plate 23b of the slide unit 2. Oil pockets 41, 41 are disposed in the under surfaces of the projections 22a, 22b forming the first sliding surfaces 31, 31 of the slide unit 2, oil pockets 42, 42 are disposed in the top surfaces of the wear plates 23a, 23b forming the second sliding surfaces 32, oil pockets 43, 43 are disposed in the inner surfaces of the first and second projections 22a, 22b forming the third sliding surfaces 33, and oil pockets 44, 44 are disposed in the outer surfaces of the wear plates 23a, 23b forming the fourth sliding surfaces 34, each of the oil pockets being disposed at proper positions.

According to a second aspect of the present invention, there is provided a hydrostatic pressure linear guide device 50 comprising a guide unit 1 having a pair of rail parts 13a, 13c on the top surface thereof, and a slide unit 2 having oil pockets in a running surface thereof. The guide unit 1 has four projections 12a, 12b, 12c, 12d disposed on the top surface of a bed 11 in bilateral symmetry to arrange three recessed parts 13a, 13b, 13c, having wear plates 14a, 14b disposed inward on the top surfaces of the outer projections 12a, 12d so as to partially block the upper parts of the first recessed part 13a and the third recessed part 13c, and thus forming a first recessed rail 13a and a second recessed rail 13c. The slide unit 2 has a stepped leg structure in which projections 22a, 22b are disposed in the under surface of a table 21 thereof in bilateral symmetry. The projections contact the top surface of inner projections 12b, 12c disposed on the guide unit 1 and the outer side surfaces thereof face the inner surfaces of the wear plates 14a, 14b disposed on the guide unit 1. Wear plates 23a, 23b are placed outward in the midway of the under surfaces of the projections 22a, 22b as the side surfaces thereof face the both side surfaces of the first recessed part 13a and the third recessed part 13c of the guide unit 1. First sliding surfaces 31, 31 are disposed in the surface where the top surfaces of the second projection 12b and the third projection 12c of the guide unit 1 contact the under surfaces of the projections 22a, 22b of the slide unit 2. Second sliding surfaces 32, 32 are disposed in the surface where the under surfaces of the wear plates 14a, 14b of the guide unit 1 contact the top surfaces of the wear plates 23a, 23b of the slide unit 2. Third sliding surfaces 33, 33 are disposed in the surface where the inner surfaces of the wear plates 14a, 14b of the guide unit 1 face the outer surfaces of the projections 22a, 22b of the slide unit 2. A fourth sliding surface 34a is disposed in the surface where the inner surface of the second projection 12b forming the first recessed part 13a of the guide unit 1 faces the left-side surface of the wear plate 23a of the slide unit 2, and a fourth sliding surface 34b is disposed in the surface where the inner surface of the third projection 12c forming the third recessed part 13c of the guide unit 1 faces the right-side surface of the wear plate 23b of the slide unit 2. A fifth sliding surface 35a is disposed in the surface where the side surface of the first projection 12a forming the first recessed part 13a of the guide unit 1 faces the right-side surface of the wear plate 23a of the slide unit 2, and a fifth sliding surface 35b is disposed in the surface where the side surface of the fourth projection 12d forming the third recessed part 13c of the guide unit 1 faces the left-side surface of the wear plate 23b of the slide unit 2. Oil pockets 41, 41 are disposed in the under surfaces of the projections 22a, 22b forming the first sliding surfaces 31 of the slide unit 2, oil pockets 42, 42 are disposed in the top surfaces of the wear plates 23a, 23b forming the second sliding surfaces 32, oil pockets 43, 43 are disposed in the outer surfaces of the slide unit projections 22a, 22b forming the third sliding surfaces 33, and oil pockets 44, 44 are disposed in the inner surfaces of the wear plates 23a, 23b forming the fourth sliding surfaces 34, each of the oil pocked being disposed at proper positions.

Since the wear plates 23a, 23b to be the leg parts of the slide unit 2 for sliding inside the pair of recessed rails 13a, 13c of the guide unit 1 are formed in the closed structure, dust and dirt are hard to enter the sliding surfaces of the recessed rails 13a, 13c in sliding. Furthermore, since the pair of wear plates 14a, 14b of the guide unit 1 suppresses the floatation of the wear plates 23a, 23b to be the leg parts of the slide unit 2, and the weight of the slide unit 2 is supported with the frame 12a and 12d (FIG. 1) or 12b and 12c (FIG. 7) of the guide unit 1 to prevent the bending of the wear plates 23a, 23b, the tilt of the table 21 is suppressed. Since the static pressure oil pockets are disposed in the first sliding surfaces and the second sliding surfaces being the side surfaces of the slide unit to prevent a traverse direction vibration, the force to act in the vertical direction with respect to the wear plates 23a, 23b is balanced. In addition, the static pressure oil pockets are also disposed in the third sliding surfaces and the fourth sliding surfaces being the side surfaces of the slide unit, the force to act in the transverse direction with respect to the wear plates 23a, 23b is balanced, and the variation in static pressure gaps becomes significantly as small as 2 to 6 μm.

The invention provides a configuration in which no contact is present while the table is sliding close to the pair of guide rails when the hydraulic is on. The device has a high stiffness and little vibration during the sliding. The obtained machining-work has a optimum linear accuracy in both longitudinal and lateral axes.

DETAILED DESCRIPTION OF THE PREFERRED EMBODIMENT

Hereinafter, the invention will be described in detail with reference to drawings. FIG. 1 to FIG. 6 show a hydrostatic pressure linear guide device 50 for mounting tools including a guide unit 1 having a pair of rail parts 13a, 13c on the top surface thereof; and a slide unit 2 having oil pockets in a running surface thereof. The guide unit 1 has four projections 12*a*, 12*b*, 12*c*, 12*d* disposed on the top surface of a bed 11 in bilateral symmetry to arrange three recessed parts 13*a*, 13*b*, 13*c*, having wear plates 14*a*, 14*b* disposed outward in the midway of the top surfaces of the inner projections 12*b*, 12*c* so as to partially block the upper parts of the first recessed part 13*a* and the third recessed part 13*c*, and thus forming a first recessed rail 13*a* and a second recessed rail 13*c*. The slide unit 2 has a stepped leg structure in which projections 22*a*, 22*b* are placed in the under surface of a table 21 thereof in bilateral symmetry. The projections contact the top surfaces of the outer projections 12*a*, 12*d* disposed on the guide unit 1, and face the outer surfaces of the wear plates 14*a*, 14*a* disposed on the guide unit 1. Wear plates 23*a*, 23*b* are further placed inward in the midway of the under surfaces of the projections 22*a*, 22*b* as the side surfaces thereof face the both side surfaces of the first recessed part 13*a* and the third recessed part 13*c* of the guide unit 1. First sliding surfaces 31, 31 are disposed in the surface where the top surfaces of the first projection 12*a* and the fourth projection 12*d* of the guide unit 1 contact the under surfaces of the projections 22*a*, 22*b* of the slide unit 2. Second sliding surfaces 32, 32 are disposed in the surface where the under surfaces of the wear plates 14*a*, 14*b* of the guide unit 1 contact the top surfaces of the wear plates 23*a*, 23*b* of the slide unit 2. Third sliding surfaces 33, 33 are disposed in the surface where the side surfaces of the wear plates 14*a*, 14*b* of the guide unit 1 face the side surfaces of the projections 22*a*, 22*b* of the slide unit 2. A fourth sliding surface 34*a* is disposed in the surface where the inner surface of the first projection 12*a* forming the first recessed part 13*a* of the guide unit 1 faces the right-side surface of the wear plate 23*a* of the slide unit 2, and a fourth sliding surface 34*b* is disposed in the surface where the inner surface of the fourth projection 12*d* forming the third recessed part 13*c* of the guide unit 1 faces the left-side surface of the wear plate 23*b* of the slide unit 2. A fifth sliding surface 35*a* is disposed in the surface where the side surface of the second projection 12*b* forming the first recessed part 13*a* of the guide unit 1 faces the left-side surface of the wear plate 23*a* of the slide unit 2, and a fifth sliding surface 35*b* is disposed in the surface where the side surface of the third projection 12*c* forming the third recessed part 13*c* of the guide unit 1 faces the right-side surface of the wear plate 23*b* of the slide unit 2. Oil pockets 41, 41 are disposed in the under surfaces of the projections 22*a*, 22*b* forming the first sliding surfaces 31, 31 of the slide unit 2, oil pockets 42, 42 are disposed in the top surfaces of the wear plates 23*a*, 23*b* forming the second sliding surfaces 32, oil pockets 43, 43 are disposed in the inner surfaces of the first and second projections 22*a*, 22*b* forming the third sliding surfaces 33, and oil pockets 44, 44 are disposed in the outer surfaces of the wear plates 23*a*, 23*b* forming the fourth sliding surfaces 34,each of the oil pockets being disposed at proper positions. The slide unit 2 can have the dimensions of 205 mm in width, 2950 mm in length in the longitudinal direction (traveling direction), and 55 mm in height. The guide unit 1 can have the dimensions of 205 mm in width, 3970 mm in length in the longitudinal direction (traveling direction), and 64 mm in height.

Figure 1:
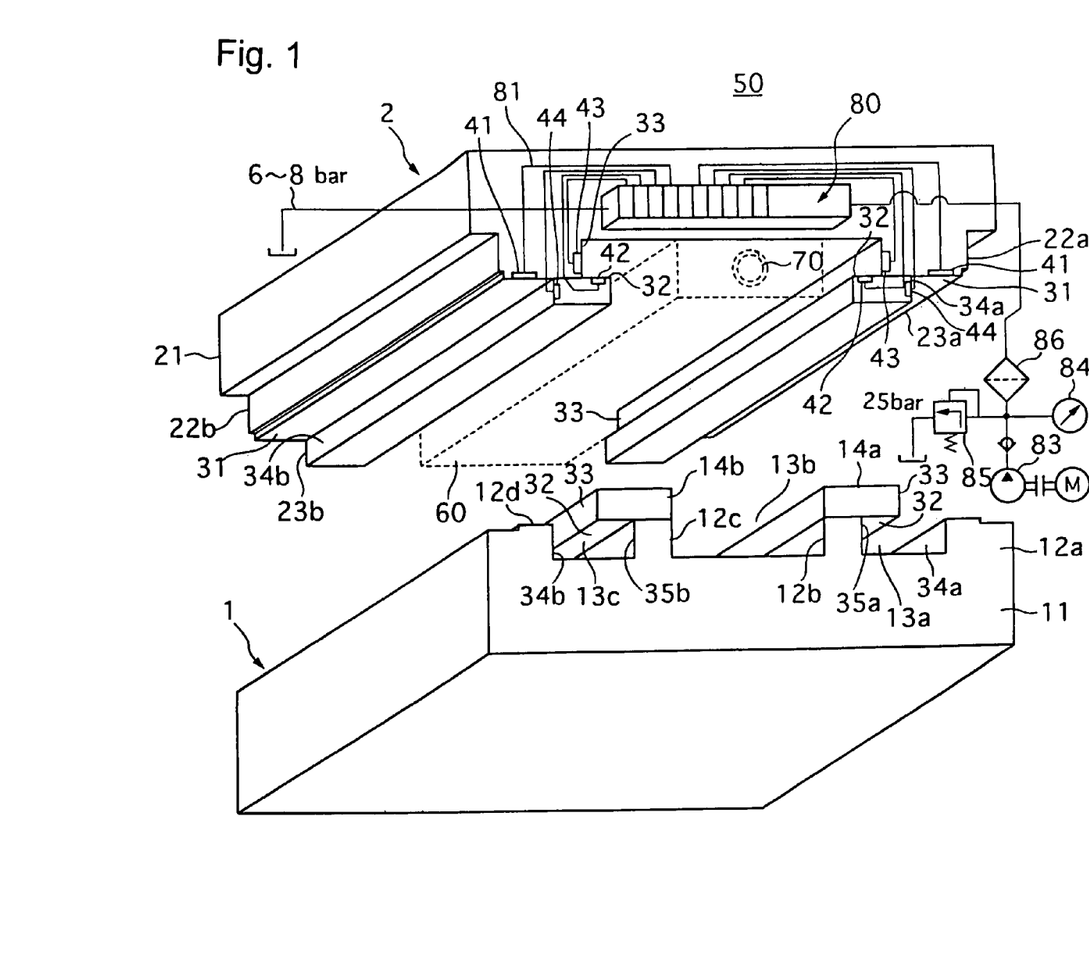
FIG. 1 is a schematic illustration showing a perspective view of a hydrostatic pressure linear guide device equipped with a tool-table according to the present invention.
Figure 2:
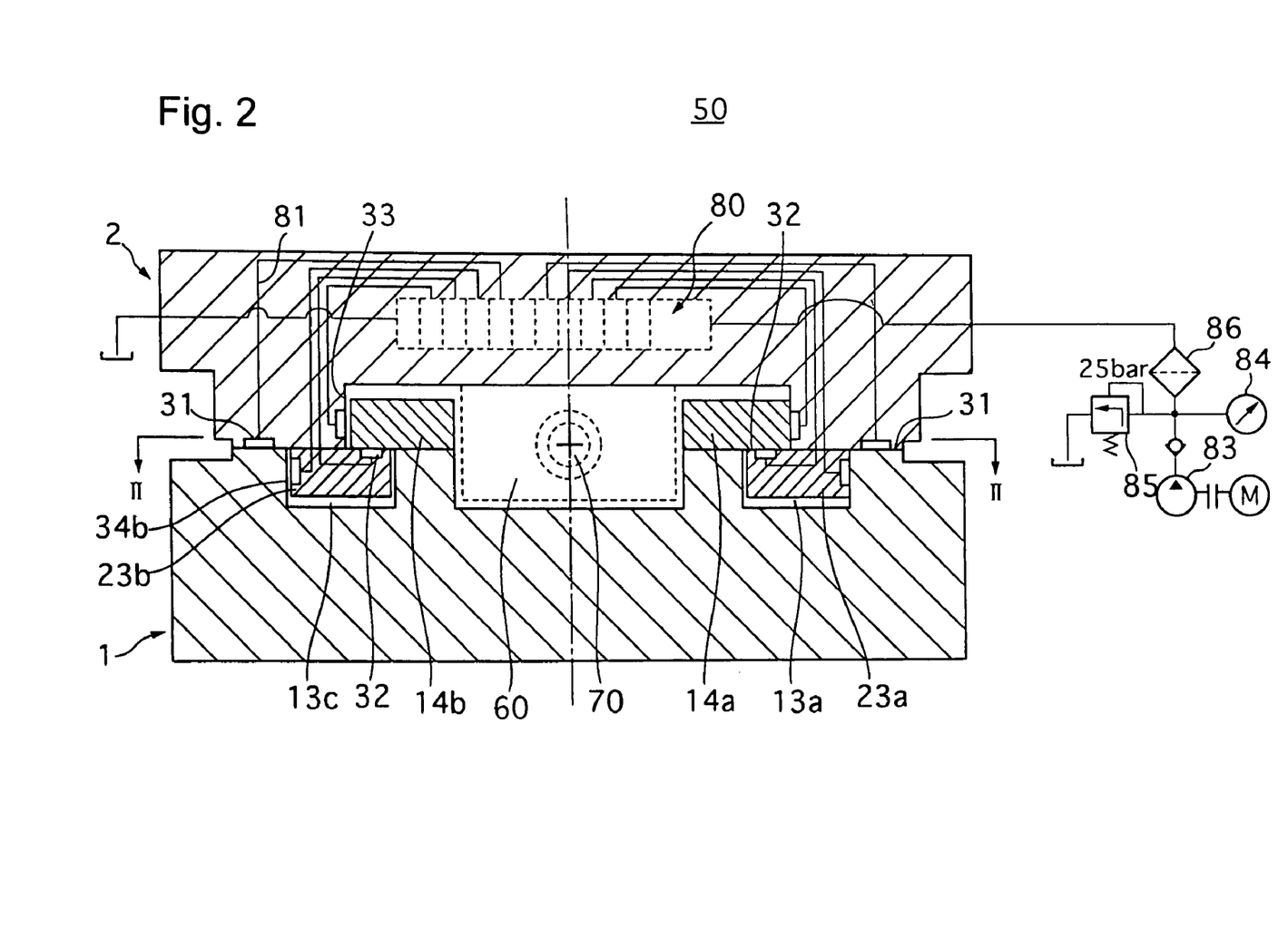
FIG. 2 is a cross sectional view of the hydrostatic pressure linear guide device.
Figure 3:
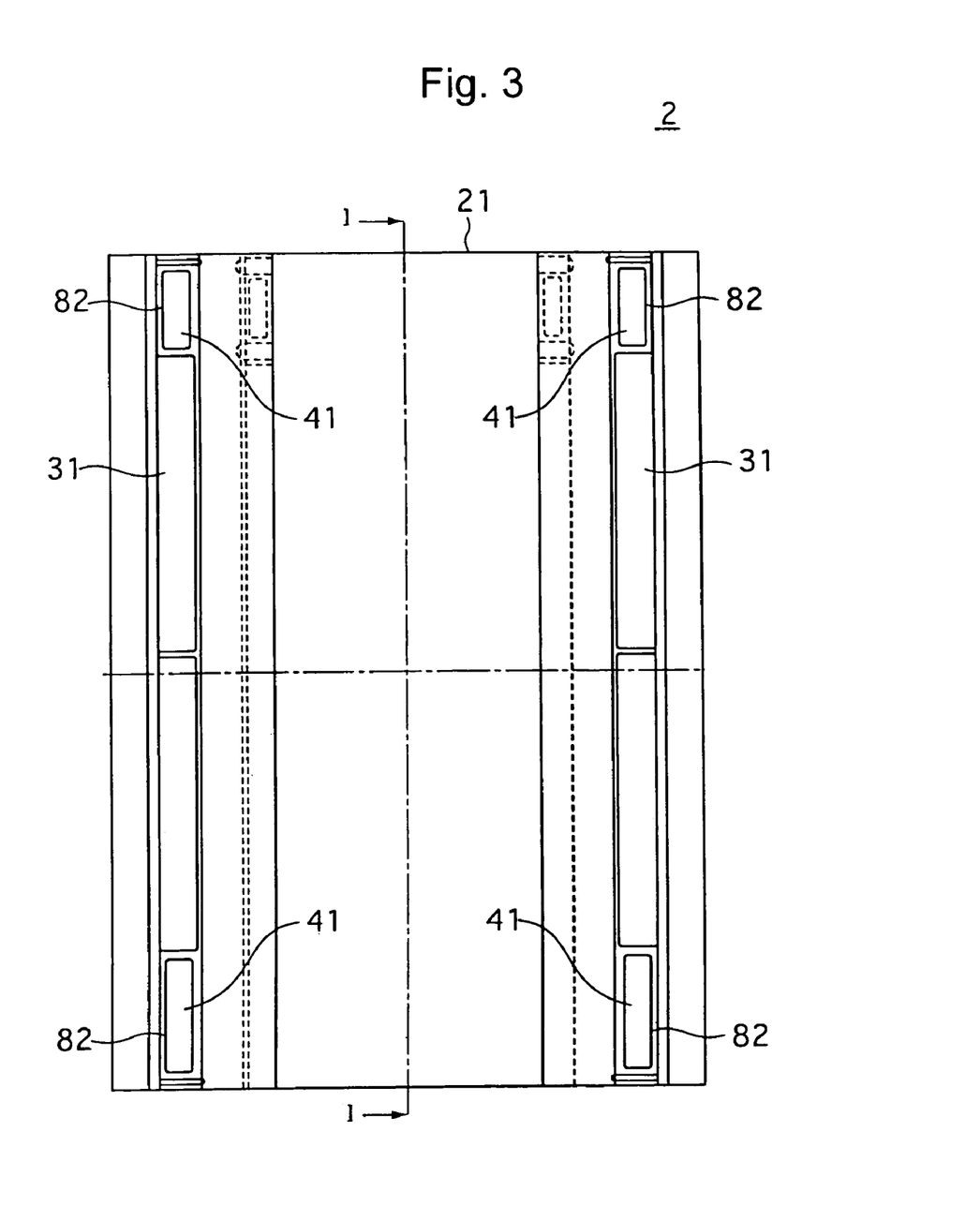
FIG. 3 is a plan view of an under-surface of a slide unit.

In the under surface of the slide unit 2, a screw product 60 having a ball screw 70 depicted by phantom lines in the center is mounted. The ball screw 70 is rotated by receiving the drive of a servo-motor (not shown) and moves the table 21 back and forth. In the back side of the slide unit 2, a PM Flow Controller (trade name) 80 made by Schonfeld GmbH with a plurality of pressure and flow control valves is disposed, and lubricating oil is supplied to the oil pockets 41, 42, 43, 44 through pipes 81. A static pressure pad 82 is disposed at the tips of the oil pockets.

This PM Flow Controller 80 controls the pressure and flow of each of the oil pockets. The oil pressure regulating lines 81 supply pressure oil to each of the oil pockets, and then pressure balances of each of the oil pockets in the vertical and lateral directions allow the slide unit 2 to be levitated above the guide rails of the guide unit 1 to suppress a sliding friction. The gap between the static pressure guide surface of the guide unit 1 and the slide unit 2 to be supported is maintained always constant in according with the control of the operation oil pressure and the operation oil temperature, so that the slide unit 2 is sliding over the railways of the guide unit 1 without contact.

To each of the oil pockets, the pressure and flow of the lubricating oil fed from an oil hydraulic pump to the controller 80 are controlled to be 5 to 50 bar, preferably 10 to 22 bar, of pressure in the static pressure oil pocket parts with static throttle valves. The oil is supplied to the static pressure oil pocket parts through connecting ports, filters and pipes, the floatation of the slide unit is set to 20 μm at the maximum, and the space between the sliding surfaces of the guide unit and the slide unit is controlled to be 2 to 10 μm in the gap at the individual oil static pressure pocket parts in sliding the slide unit 2. The controller 80 having a plurality of these static throttle valves and port parts is commercially available by the trade name of PM-Flow Controller from Schonfeld GmbH in Germany. This controller has a structure that it is mounted on the side wall of the slide unit 2, and the structure is disclosed in U.S. Pat. No. 6,276,491 and U.S. Pat. No. 6,220,281.

In FIG. 1, M is a motor, 83 is an oil hydraulic pump, 84 is a pressure gauge, 85 is a relief valve, and 86 is a pressure control valve.

Figure 4:
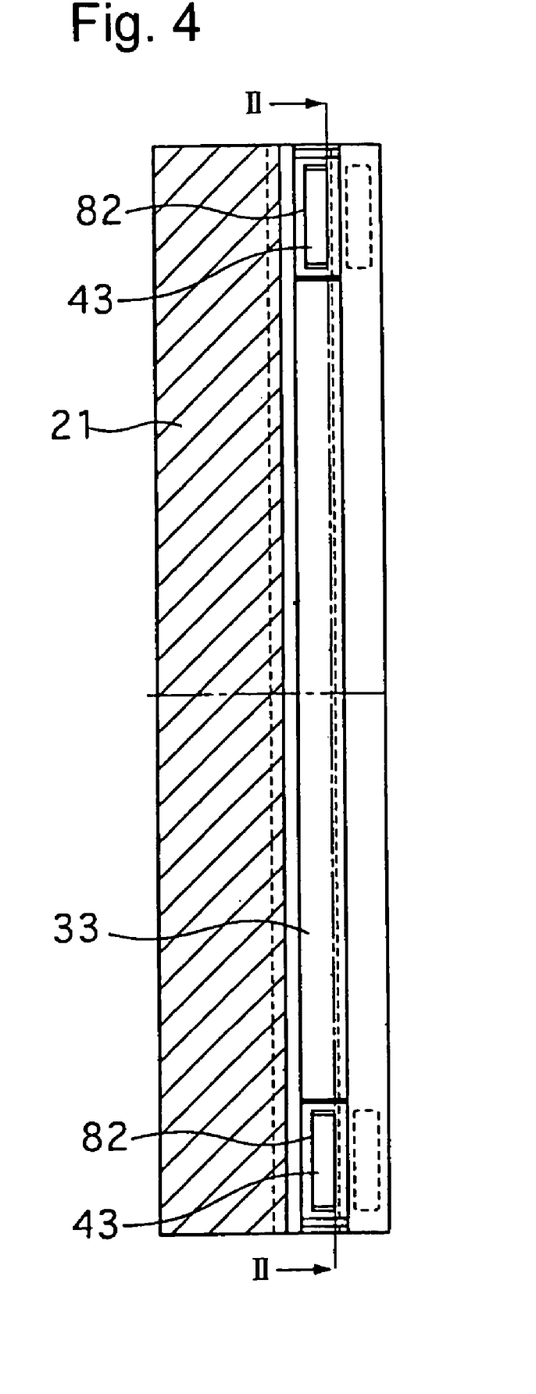
FIG. 4 is a cross sectional view taken along the line I—I in FIG. 3.
Figure 5:
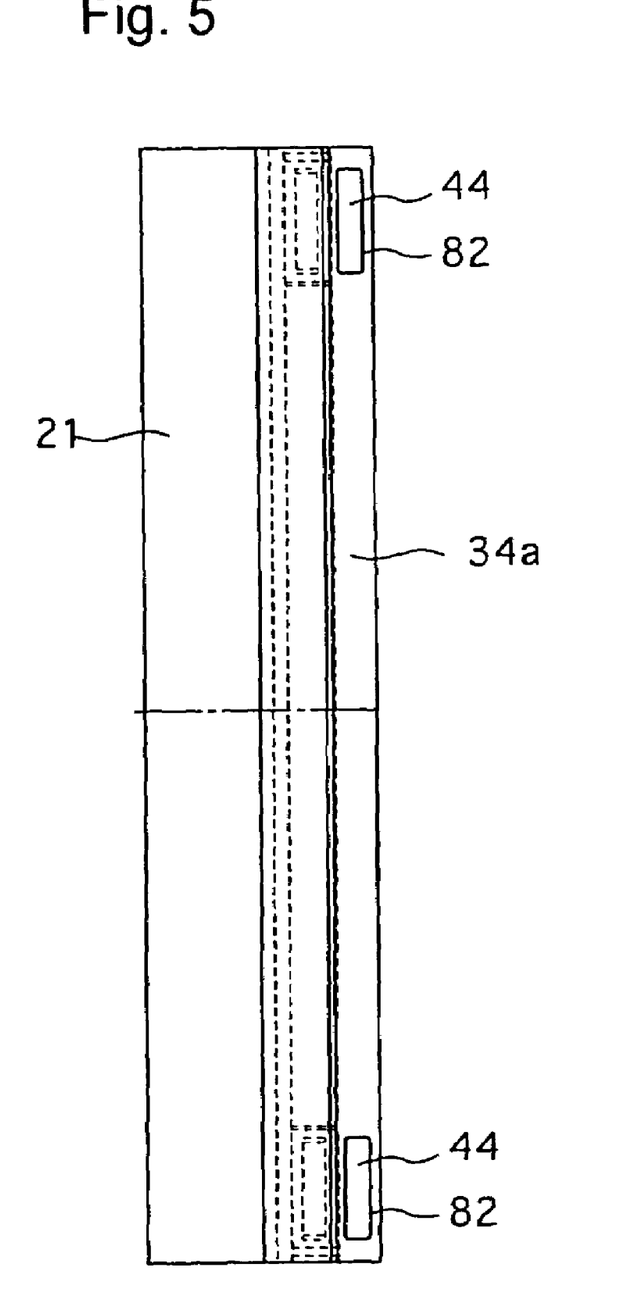
FIG. 5 is a side view of the slide unit taken inner side.
Figure 6:
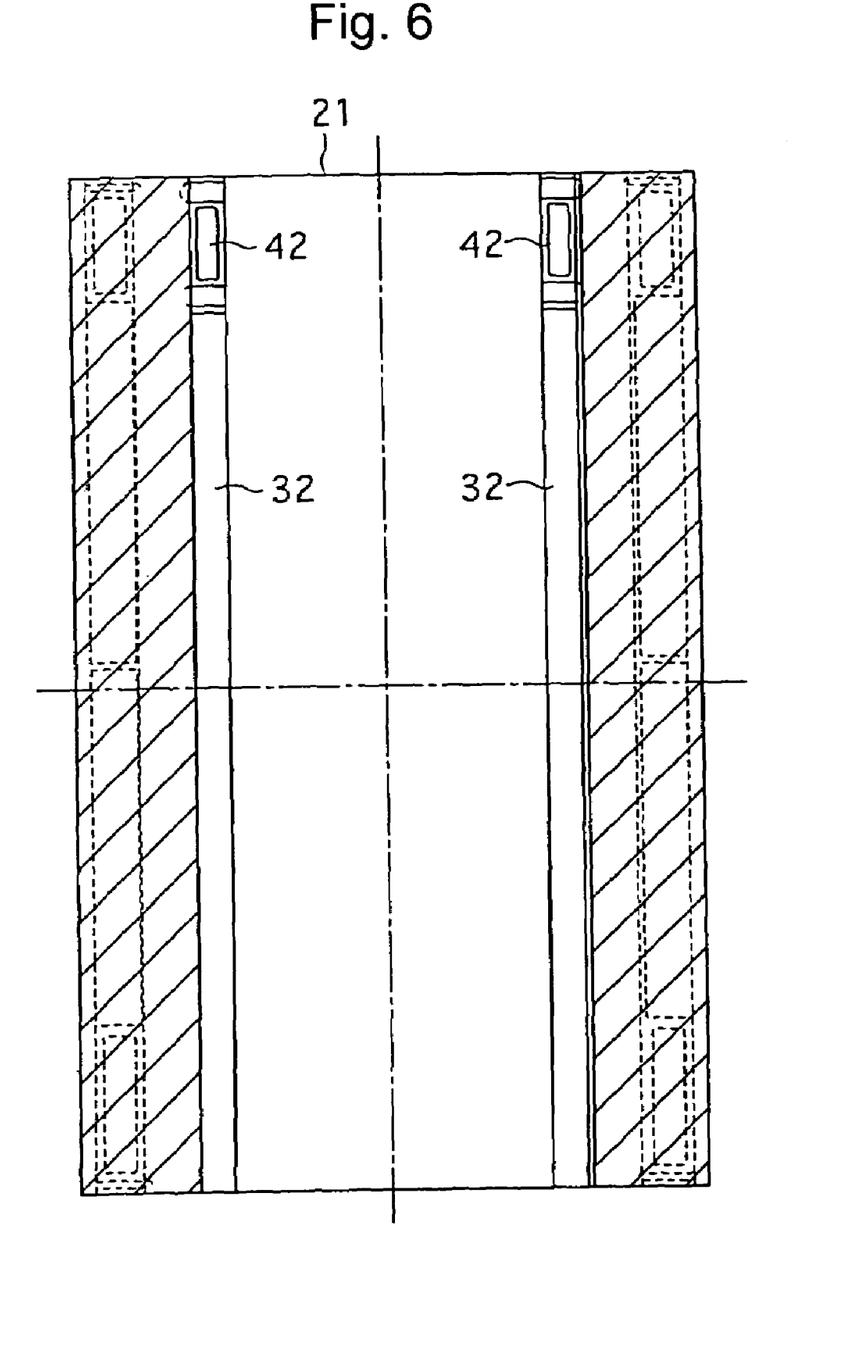
FIG. 6 is a cross sectional view taken along the line II—II in FIG. 4.

For the positions and the number of oil pockets disposed in each of the sliding surfaces of the slide unit 2, the lubricating oil supplied to the oil pockets keeps the sliding surface gap between the slide unit 2 and the guide unit 1 at 2 to 10 μm so as not to contact the sliding surfaces of the slide unit 2 with the guide unit 1 each other when the slide unit 2 slides on the guide unit 1. As shown in FIG. 3, four oil pockets 41 are disposed in the first sliding surfaces 31, 31 of the slide unit 2, and the oil pressure of the oil pockets is kept at 6 bar. As shown in FIG. 4, two oil pockets 43 each are disposed in the third sliding surfaces 33, 33 of the slide unit 2, and the oil pressure of the oil pockets is kept at 10 to 22 bar. As shown in FIG. 5, two oil pockets 44 each are disposed in the fourth sliding surfaces 34*a*, 34*b* of the slide unit 2, and the oil pressure of the oil pockets is kept at 5 to 14 bar. As shown in FIG. 6, one oil pocket 42 each is disposed in the second sliding surfaces 32, 32 of the slide unit 2, the oil pockets are not formed on the side where tools are mounted (on the under side in FIG. 6), and the oil pressure of the oil pockets 42, 42 is kept at 5 to 14 bar. In this connection, the gap of the fourth sliding surfaces 34*a*, 34*b* where the side surfaces of the wear plates 14*a*, 14*b* of the guide unit 1 contact the side surfaces of the projections 22*a*, 22*b* of the slide unit 2 is 2 to 8 μm, whereas the gap of the fifth sliding surfaces 35, 35 is as wide as 4 to 10 mm. The oil pressure is the value where the inner diameter of a steel pipe of the oil pockets is 4.6 mm. For the floatation of the slide unit 2, the positions and number of the oil pockets are preferably set to 20 μm at the maximum.

The amount of the lubricating oil supplied is varied in accordance with the weight and dimensions of the slide unit, types of the lubricating oil, the traveling speed of the table, and set pressure, being selected properly from 0.20 to 4.5 l/min. The pressure of oil recovered is set to 0.8 bar.

In another aspect of the positions to dispose the oil pockets, two oil pockets 43 each disposed in the third sliding surfaces 33, 33 of the slide unit 2 are not necessarily disposed when the lubricating oil supplied from two oil pockets 44 each disposed in the fourth sliding surfaces 34a, 34b of the slide unit 2 can keep the gap between the side surfaces of the wear plates 23a, 23b of the slide unit and the side surfaces of the wear plates 14a, 14b of the guide unit to be 2 to 7 μm. Furthermore, in the case where the gap of the fifth sliding surface 35a is formed in the surface where the side surface of the second projection 12b forming the first recessed part 13a of the guide unit 1 faces the left-side surface of the wear plate 23a of the slide unit 2 and the gap of the fifth sliding surface 35b is formed in the surface where the side surface of the third projection 12c forming the recessed part 13c of the guide unit 1 faces the right-side surface of the wear plate 23b of the slide unit at 2 to 8 μm, and the gap of the fourth sliding surfaces 34, 34 is formed as wide as 4 to 10 mm in the surface where the side surfaces of the wear plates 14a, 14b of the guide unit 1 face the side surfaces of the projections 22a, 22b of the slide unit 2, the oil pockets 44 disposed in the fourth sliding surfaces 34, 34 are unnecessary, and instead, two oil pockets each are disposed in the side surfaces of the wear plates 23a, 23b forming the fifth sliding surfaces 35a, 35b.

FIGS. 7 to 12 show a hydrostatic pressure linear guide device 50 for a work table including a guide unit 1 having a pair of rail parts 13a, 13c on the top surface thereof, and a slide unit 2 having oil pockets in a running surface thereof. The guide unit 1 has four projections 12a, 12b, 12c, 12d disposed on the top surface of a bed 11 in bilateral symmetry to arrange three recessed parts 13a, 13b, 13c, having wear plates 14a, 14b disposed inward on the top surfaces of the outer projections 12a, 12d so as to partially block the upper parts of the first recessed part 13a and the third recessed part 13c, and thus forming a first recessed rail 13a and a second recessed rail 13c. The slide unit 2 has a stepped leg structure in which projections 22a, 22b are disposed in the under surface of a table 21 thereof in bilateral symmetry. The projections contact the top surface of the projections 12b, 12c disposed on the guide unit 1 and the outer side surfaces thereof face the inner surfaces of the wear plates 14a, 14b disposed on the guide unit 1. Wear plates 23a, 23b are placed outward in the midway of the under surfaces of the projections 22a, 22b as the side surfaces thereof face the both side surfaces of the first recessed part 13a and the third recessed part 13c of the guide unit 1. First sliding surfaces 31, 31 are disposed in the surface where the top surfaces of the second projection 12b and the third projection 12c of the guide unit 1 contact the under surfaces of the projections 22a, 22b of the slide unit 2. Second sliding surfaces 32, 32 are disposed in the surface where the under surfaces of the wear plates 14a, 14b of the guide unit 1 contact the top surfaces of the wear plates 23a, 23b of the slide unit 2. Third sliding surfaces 33, 33 are disposed in the surface where the inner surfaces of the wear plates 14a, 14b of the guide unit 1 face the outer surfaces of the projections 22a, 22b of the slide unit 2. A fourth sliding surface 34a is disposed in the surface where the inner surface of the second projection 12b forming the first recessed part 13a of the guide unit 1 faces the left-side surface of the wear plate 23a of the slide unit 2, and a fourth sliding surface 34b is disposed in the surface where the inner surface of the third projection 12c forming the third recessed part 13c of the guide unit 1 faces the right-side surface of the wear plate 23b of the slide unit 2. A fifth sliding surface 35a is disposed in the surface where the side surface of the first projection 12a forming the first recessed part 13a of the guide unit 1 faces the right-side surface of the wear plate 23a of the slide unit 2, and a fifth sliding surface 35b is disposed in the surface where the side surface of the fourth projection 12d forming the third recessed part 13c of the guide unit 1 faces the left-side surface of the wear plate 23b of the slide unit 2. Oil pockets 41, 41 are disposed in the under surfaces of the projections 22a, 22b forming the first sliding surfaces 31 of the slide unit 2, oil pockets 42, 42 are disposed in the top surfaces of the wear plates 23a, 23b forming the second sliding surfaces 32, oil pockets 43, 43 are disposed in the outer surfaces of the slide unit projections 22a, 22b forming the sliding surfaces 33, and oil pockets 44, 44 are disposed in the outer surfaces of the wear plates 23a, 23b forming the fourth sliding surfaces 34, each of the oil pockets being disposed at proper positions. The slide unit 2 can have the dimensions of 800 mm in width, 4250 mm in length in the longitudinal direction (traveling direction), and 335 mm in height. The guide unit 1 can have the dimensions of 1030 mm in width, 8500 mm in length in the longitudinal direction (traveling direction), and 250 mm in height.

Figure 7:
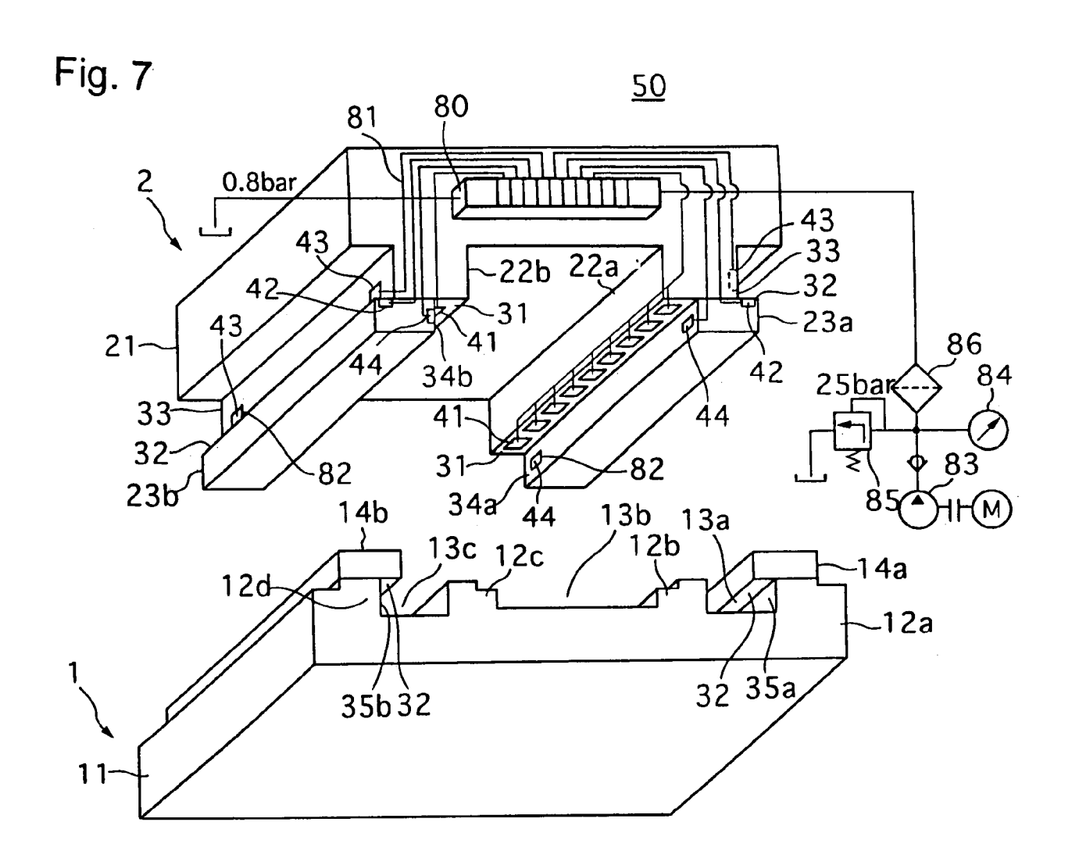
FIG. 7 is a schematic illustration showing in perspective view of a hydrostatic pressure linear guide device equipped with a work-table according to the present invention.
Figure 8:
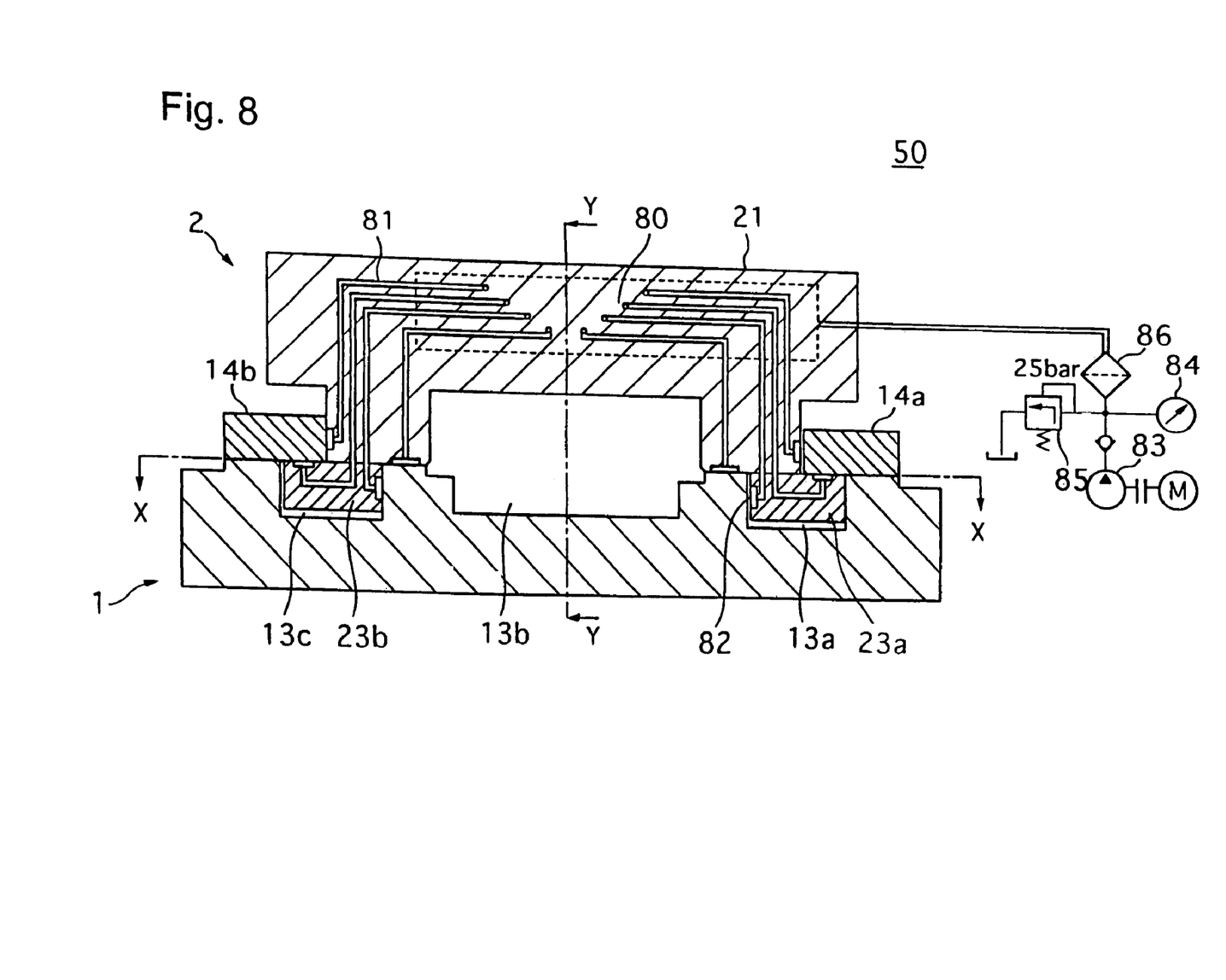
FIG. 8 is a cross sectional view of the hydrostatic pressure linear guide device.

On the back side of the slide unit 2, a PM flow Controller (trade name) 80 made by Schonfeld GmbH is disposed, and lubricating oil is supplied to each of the oil pockets 41, 42, 43, 44 through pipes 81. A static pressure pad 82 is disposed at the tips of the oil pockets. In FIG. 7, M is a motor, 83 is an oil hydraulic pump, 84 is a pressure gauge, 85 is a relief valve, and 86 is a valve pressure valve.

Figure 9:
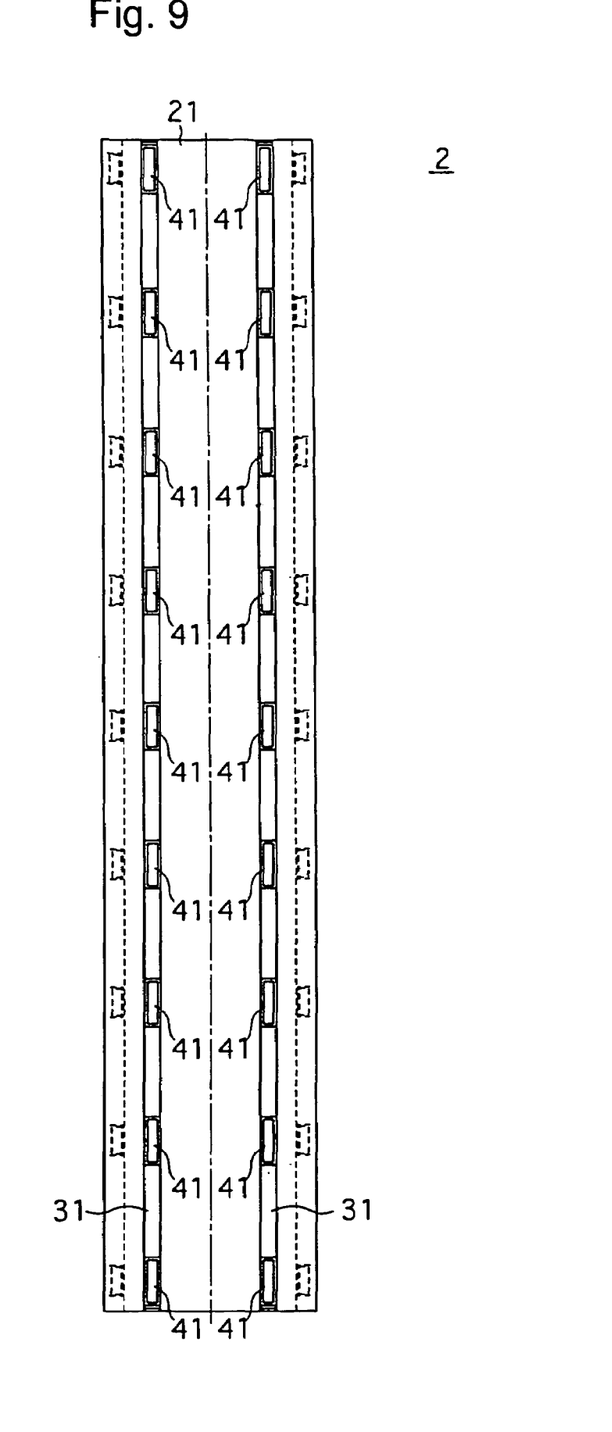
FIG. 9 is a plan view of an under-surface of a slide unit.
Figure 10:
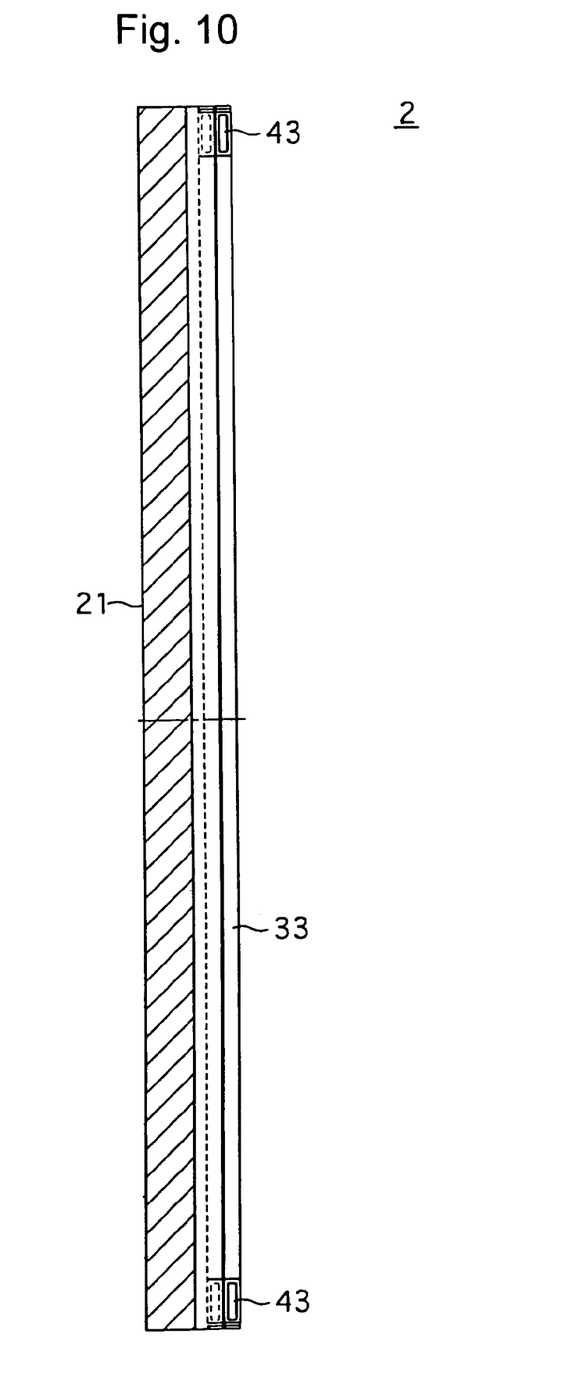
FIG. 10 is a cross sectional view taken along the line Y—Y in FIG. 8.
Figure 11:
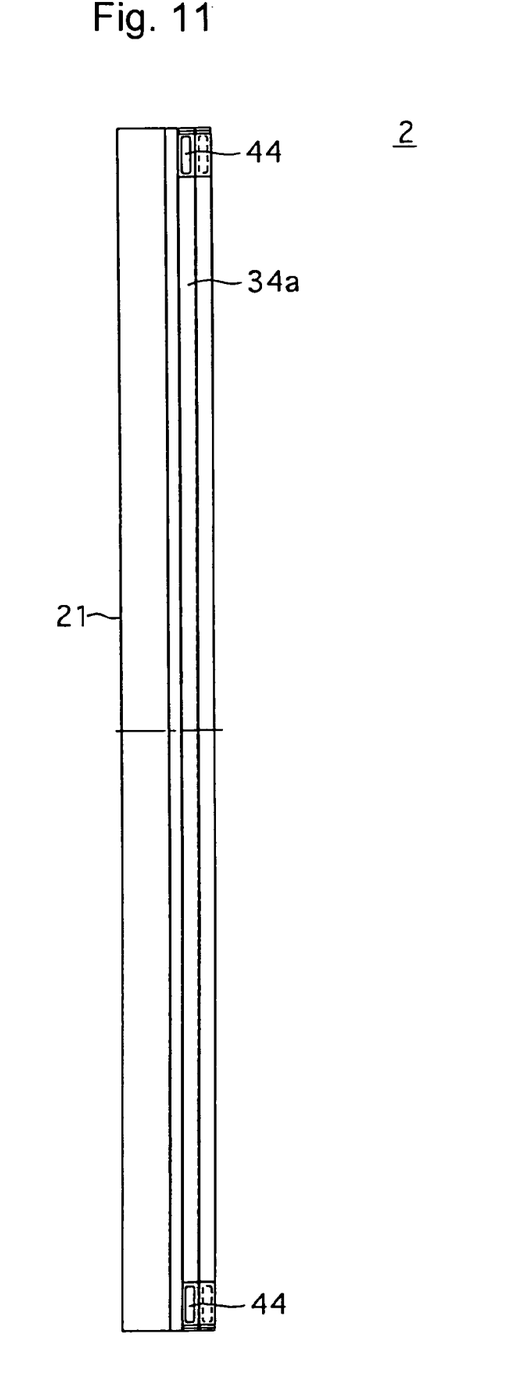
FIG. 11 is a side view of the slide unit taken inner side.
Figure 12:
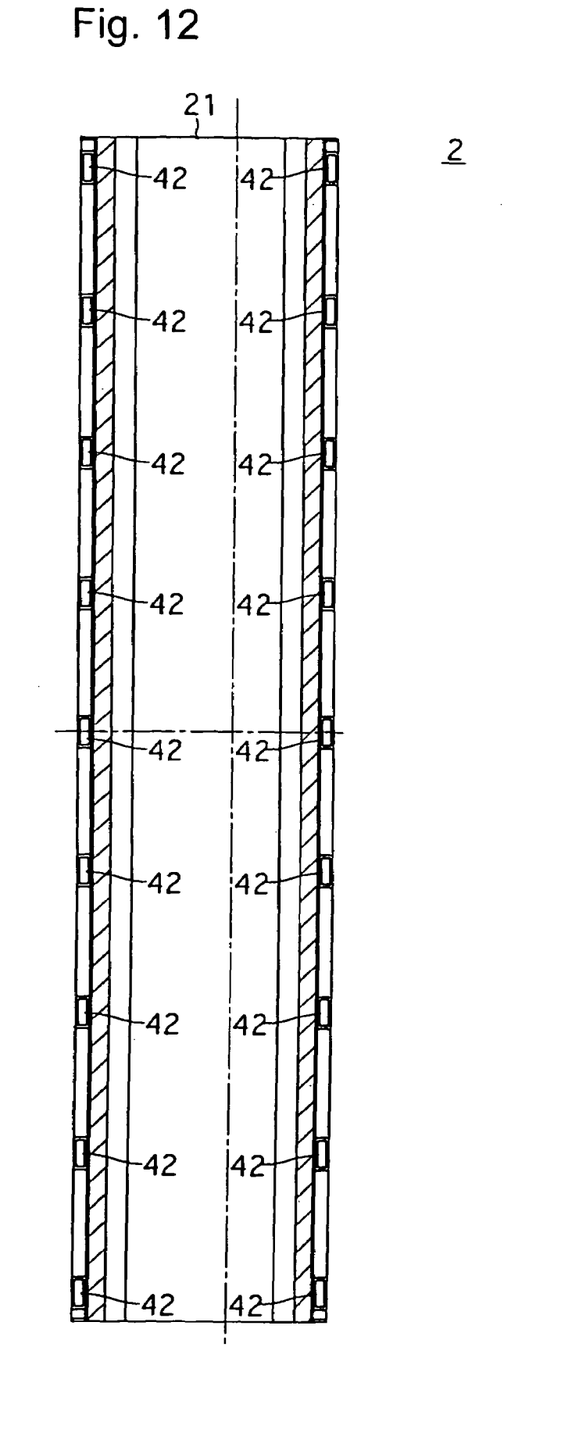
FIG. 12 is a cross sectional view taken along the line X—X in FIG. 8.

For the positions and the number of oil pockets disposed in each of the sliding surfaces of the slide unit 2, the lubricating oil supplied to the oil pockets keeps the sliding surface gap between the slide unit 2 and the guide unit 1 at 2 to 7 μm (10 to 22 bar of oil pressure) so as not to contact the sliding surfaces of the slide unit 2 with the guide unit 1 each other when the slide unit 2 slides above the rails of the guide unit 1. As shown in FIG. 9, nine oil pockets 41 each are disposed in the first sliding surfaces 31, 31 of the slide unit 2 right and left. As shown in FIG. 10, two oil pockets 43 each are disposed in the third sliding surfaces 33, 33 of the slide unit 2. As shown in FIG. 11, two oil pockets 44 each are disposed in the fourth sliding surfaces 34a, 34b of the slide unit 2. As shown in FIG. 12, nine oil pockets 42 each are disposed in the second sliding surfaces 32, 32 of the slide unit 2 right and left.

For a power source for driving the slide unit 2 of the hydrostatic pressure linear guide device 50, a hydraulic cylinder may be used other than the combination of a linear motor or a ball screw with a servo-motor.

The hydrostatic pressure linear guide device 50 according to the invention has stiffness 3 to 5 times higher than that of conventional oil static pressure linear guide devices, and the variation in oil film thickness of the guide face is about one-seventh of that of the publicly-known oil static pressure linear guide devices. Therefore, vibrations of the table are suppressed. Furthermore, the amount of the pressure oil supplied to the guide face is suppressed to about one-third of that of the conventional oil static pressure linear guide devices. Moreover, when a table of dimensions having 4000 mm in the longitudinal direction and 800 mm in the transversal direction is used, the straightness accuracy of the reference plane of the table is 0.4 μm/1000 mm in the longitudinal direction and 0.4 μm/800 mm in the transverse direction when the oil pressure of the inlet is 25 bar and the oil pressure of the outlet is 6~8 bar. The apparatus is suitable for the hydrostatic pressure linear guide device of a grinding apparatus for ultra-precision machining.

The accuracy of straightness of the obtained grinding-work (SUS420J2) both longitudinal and transverse axis are as follow;

| Work size | Table size | Straightness of grinding work |
|---|---|---|
| 2200 × 150 × 100 mm | 4250 × 800 × 335 mm | 0.8 μm/2200 mm<br>0.3 μm/150 mm |
| 4000 × 1500 × 100 mm | 4250 × 1600 × 400 mm | 1.3 μm/4000 mm<br>0.3 μm/1500 mm |

A floating distance between the work-table and a grinding head of the present hydrostatic pressure linear guide device depends on the feeding speed of the slide unit, but they are in a narrow ranges of 0.01–0.08 μm when the feeding speed is 1–25 m/minute. This means the vibration of the table is very minimal. The hydrostatic pressure linear guide device according to the present invention has no reversal backlash of friction force and the shock of the reverse of tool-table is diminished in less than 0.6 seconds.

The present invention relates to Japanese Patent Application No. 2004-845, which was filed in Japan on Jan. 6, 2004, and which is hereby incorporated by reference in its entirety.

What is claimed is:

1. A hydrostatic linear guide device comprising a guide unit having a pair of rail parts on a top surface thereof; and a slide unit having oil pockets in a running surface thereof, wherein the guide unit has four projections, disposed on the top surface of a bed in bilateral symmetry to arrange three recessed parts, having wear plates disposed outward in the midway of the top surfaces of the second and third projections so as to partially block the upper parts of the first recessed part and the third recessed part, and thus forming a first recessed rail and a second recessed rail;

wherein the slide unit has a stepped leg structure in which projections are placed in the under surface of a table thereof in bilateral symmetry, the projections contact the top surfaces of the first and fourth projections disposed on the guide unit and face the outer surfaces of the wear plates disposed on the guide unit, and wear plates of the slide unit are further placed inward in the midway of the under surfaces of the projections of the slide unit as the side surfaces thereof face the both side surfaces of the first recessed part and the third recessed part of the guide unit; and wherein first sliding surfaces are disposed in the surface where the top surfaces of the first projection and the fourth projection of the guide unit contact the under surfaces of the projections of the slide unit;

second sliding surfaces are disposed in the surface where the under surfaces of the wear plates of the guide unit contact the top surfaces of the wear plates of the slide unit;

third sliding surfaces are disposed in the surface where the side surfaces of the wear plates of the guide unit face the side surfaces of the projections of the slide unit;

a fourth sliding surface is disposed in the surface where the inner surface of the first projection forming the first recessed part of the guide unit faces the right-side surface of the wear plate of the slide unit, and another fourth sliding surface is disposed in the surface where the inner surface of the fourth projection forming the third recessed part of the guide unit faces the left-side surface of the wear plate of the slide unit;

a fifth sliding surface is disposed in the surface where the side surface of the second projection forming the first recessed part of the guide unit faces the left-side surface of the wear plate of the slide unit, and another fifth sliding surface is disposed in the surface where the side surface of the third projection forming the third recessed part of the guide unit faces the right-side surface of the wear plate of the slide unit; and oil pockets are disposed in the under surfaces of the projections forming the first sliding surfaces of the slide unit, oil pockets are disposed in the top surfaces of the wear plates forming the second sliding surfaces, oil pockets are disposed in the inner surfaces of the first and second projections forming the third sliding surfaces, and oil pockets are disposed in the outer surfaces of the wear plates forming the fourth sliding surfaces.

2. A hydrostatic pressure linear guide device comprising a guide unit having a pair of rail parts on a top surface thereof; and a slide unit having oil pockets in a running surface thereof, wherein the guide unit is the guide unit having four projections, disposed on the top surface of a bed in bilateral symmetry to arrange three recessed parts, having wear plates disposed inward on the top surfaces of the first and fourth projections so as to partially block the upper parts of the first recessed part and the third recessed part, and thus forming a first recessed rail and a second recessed rail;

wherein the slide unit has a stepped leg structure in which projections are disposed in the under surface of a table thereof in bilateral symmetry, the projections contact the top surface of second and third projections disposed on the guide unit and the outer side surfaces thereof face the inner surfaces of the wear plates disposed on the guide unit, and wear plates of the slide unit are placed outward in the midway of the under surfaces of the projections of the slide unit as the side surfaces thereof face the both side surfaces of the first recessed part and the third recessed part of the guide unit; and wherein first sliding surfaces are disposed in the surface where the top surfaces of the second projection and the third projection of the guide unit contact the under surfaces of the projections of the slide unit;

second sliding surfaces are disposed in the surface where the under surfaces of the wear plates of the guide unit contact the top surfaces of the wear plates of the slide unit;

third sliding surfaces are disposed in the surface where the inner surfaces of the wear plates of the guide unit face the outer surfaces of the projections, of the slide unit;

a fourth sliding surface is disposed in the surface where the inner surface of the second projection forming the first recessed part of the guide unit faces the left-side surface of the wear plate of the slide unit, and another fourth sliding surface is disposed in the surface where the inner surface of the third projection forming the third recessed part of the guide unit faces the right-side surface of the wear plate of the slide unit;

a fifth sliding surface is disposed in the surface where the side surface of the first projection forming the first recessed part of the guide unit faces the right-side surface of the wear plate of the slide unit, and another fifth sliding surface is disposed in the surface where the side surface of the fourth projection forming the third recessed part of the guide unit faces the left-side surface of the wear plate of the slide unit; and oil pockets are disposed in the under surfaces of the projections forming the first sliding surfaces of the slide unit, oil pockets are disposed in the top surfaces of the wear plates forming the second sliding surfaces, oil pockets are disposed in the outer surfaces of the slide unit projections forming the third sliding surfaces, and oil pockets are disposed in the inner surfaces of the wear plates forming the fourth sliding surfaces.

* * * * *